US012630731B2

(12) United States Patent
Yamazaki et al.

(10) Patent No.: US 12,630,731 B2
(45) Date of Patent: May 19, 2026

(54) NON-AQUEOUS INK COMPOSITION

(71) Applicant: DNP FINE CHEMICALS CO., LTD., Yokohama (JP)

(72) Inventors: Fumie Yamazaki, Yokohama (JP); Ryosuke Kotani, Yokohama (JP); Yoshiya Maegawa, Yokohama (JP)

(73) Assignee: DNP FINE CHEMICALS CO., LTD., Yokohama (JP)

( * ) Notice: Subject to any disclaimer, the term of this patent is extended or adjusted under 35 U.S.C. 154(b) by 131 days.

(21) Appl. No.: 18/699,785

(22) PCT Filed: Dec. 20, 2022

(86) PCT No.: PCT/JP2022/046874
§ 371 (c)(1),
(2) Date: Apr. 9, 2024

(87) PCT Pub. No.: WO2023/120521
PCT Pub. Date: Jun. 29, 2023

(65) Prior Publication Data
US 2025/0236749 A1      Jul. 24, 2025

(30) Foreign Application Priority Data
Dec. 21, 2021     (JP) ................................. 2021-206968

(51) Int. Cl.
| | |
|---|---|
| *C09D 11/36* | (2014.01) |
| *B41J 2/01* | (2006.01) |
| *B41J 2/21* | (2006.01) |
| *B41M 5/00* | (2006.01) |
| *C08K 9/02* | (2006.01) |
| *C09D 11/322* | (2014.01) |

(52) U.S. Cl.
CPC ................. *C09D 11/36* (2013.01); *B41J 2/01* (2013.01); *B41J 2/2107* (2013.01); *C08K 9/02* (2013.01); *C09D 11/322* (2013.01); *B41M 5/0023* (2013.01); *C08K 2201/002* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 25/001; B41J 25/34; B41J 25/003; B41J 2/18; B41J 25/312; B41J 2025/008; B41J 2202/21; B41J 2/17596; B41J 2/16508; B41J 2/1652; B41J 2/175; B41J 2/17563;

C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2007/0022904 A1 * | 2/2007 | Kitawaki | ............... | C09D 11/36 |
| | | | | 106/31.86 |
| 2007/0051272 A1 * | 3/2007 | Wheeler | ................... | C09C 1/64 |
| | | | | 106/404 |
| 2009/0214833 A1 | 8/2009 | Oyanagi et al. | | |
| 2011/0054088 A1 | 3/2011 | Oyanagi et al. | | |
| 2012/0048141 A1 * | 3/2012 | Arai | ..................... | C09D 11/322 |
| | | | | 106/31.8 |

(Continued)

FOREIGN PATENT DOCUMENTS

| | | |
|---|---|---|
| JP | 2007-046034 A | 2/2007 |
| JP | 2011-052041 A | 3/2011 |

(Continued)

OTHER PUBLICATIONS

Mar. 20, 2023 International Search Report issued in International Patent Application No. PCT/JP2022/046874.

(Continued)

*Primary Examiner* — Manish S Shah
(74) *Attorney, Agent, or Firm* — Oliff PLC

(57) ABSTRACT

A non-aqueous ink composition has high inkjet ejection stability even when a metal-containing brilliance pigment is contained therein. The non-aqueous ink composition, which is ejected by an inkjet method, contains an organic solvent and a brilliance pigment, wherein: the brilliance pigment contains a metal-containing brilliance pigment; a relationship among a volume-based cumulative 10% particle size (D10) (μm), a volume-based cumulative 50% particle size (D50) (μm), and a volume-based cumulative 90% particle size (D90) (μm) satisfies a relationship of expression (I); and the D90 is at most 5.0 μm.

$$(D90 - D10)/D50 \leq 2 \qquad (1)$$

9 Claims, 1 Drawing Sheet

(56)  References Cited

U.S. PATENT DOCUMENTS

| 2012/0083567 | A1* | 4/2012 | Hosoya | C09D 11/322 |
| | | | | 524/516 |
| 2012/0135209 | A1 | 5/2012 | Becker | |
| 2012/0174824 | A1 | 7/2012 | Takenaka et al. | |
| 2012/0249666 | A1* | 10/2012 | Maki | C09D 11/322 |
| | | | | 106/31.75 |
| 2012/0287213 | A1 | 11/2012 | Engel et al. | |
| 2015/0315397 | A1 | 11/2015 | Toyoda et al. | |
| 2017/0130054 | A1* | 5/2017 | Dietz | C09D 5/36 |
| 2017/0173942 | A1* | 6/2017 | Toyoda | B41J 2/2107 |
| 2021/0108099 | A1* | 4/2021 | Caffier | C09D 11/18 |

FOREIGN PATENT DOCUMENTS

| JP | 2011-052046 | A | 3/2011 |
| JP | 2011-140660 | A | 7/2011 |
| JP | 2013-023562 | A | 2/2013 |
| JP | 2014-520170 | A | 8/2014 |
| JP | 2015-212018 | A | 11/2015 |
| WO | 2012/156204 | A1 | 11/2012 |
| WO | 2013/011772 | A1 | 1/2013 |

OTHER PUBLICATIONS

Dec. 1, 2025 Extended European Search Report issued in European
Application No. 22911223.0.

\* cited by examiner

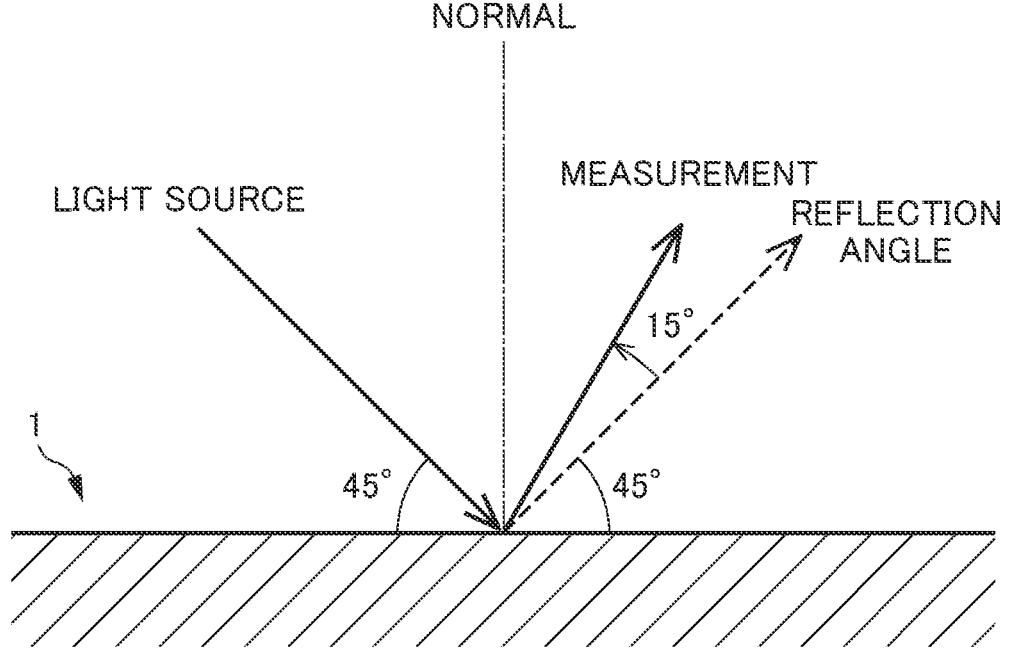

NON-AQUEOUS INK COMPOSITION

TECHNICAL FIELD

The present invention relates to a non-aqueous ink composition for photoluminescent decorative printing, the composition being mainly discharged by an inkjet method.

BACKGROUND ART

In recent years, as printed matters have increasingly been produced in smaller lots and in greater variety, an inkjet printing method, which is for print-on-demand, has been attracting attention as an alternative to a conventional offset printing method. Compared with the conventional offset printing method, the inkjet printing method has advantages, for example, in terms of simplicity, economic efficiency, and energy saving. The inkjet printing method is a printing method in which tiny ink droplets discharged from a printer head impact on a recording medium and then are fixed through drying, curing, penetration, etc. to thereby form dots, which are gathered together to form an image.

In addition, it is sometimes performed to express a metallic tone image on an object such as a printed matter that is a substrate (recording medium) or a surface thereof on which a colored ink composition has been partially or wholly applied. As a technology to add such metallic luster, application of ink using metallic powder made of brass, aluminum particles, etc.; foil-stamping printing using metal foil; or thermal transfer printing using metal foil has been used.

And in recent years, in addition to the above methods of forming a coating film with metallic luster, there have been many applications to inkjet printing methods, one of which is photoluminescent decorative printing. Inkjet-based photoluminescent decorative printing is mainly performed using an inkjet printer.

For example, Patent Document 1 describes an ink composition containing a metallic pigment (metal-containing brilliant pigment) having a predetermined particle size. Patent Document 1 describes that this ink composition improves print stability and luster of a recorded matter in inkjet recording.

Furthermore, Patent Document 2 describes an ink composition containing a predetermined organic solvent and a metallic pigment (metal-containing brilliant pigment) having a predetermined particle size. Patent Document 2 describes that this ink composition has excellent ink discharge stability and print stability.

CITATION LIST

Patent Document

Patent Document 1: Japanese Unexamined Patent Application, Publication No. 2011-140660
Patent Document 2: Japanese Unexamined Patent Application, Publication No. 2011-052046

DISCLOSURE OF THE INVENTION

Problems to be Solved by the Invention

In recent years, with development of inkjet printers, higher definition, higher image quality, and higher speed continuous printing have been in the process of being achieved.

However, the inventors have revealed that when a metal-containing brilliant pigment is contained in a non-aqueous ink composition, a problem may arise in inkjet discharge stability due to the a metal-containing brilliant pigment.

An object of the present invention is to improve inkjet discharge stability even for a non-aqueous ink composition containing a metal-containing brilliant pigment.

Means for Solving the Problems

As a result of extensive studies to solve the above problem, the present invention has been completed based on findings that a non-aqueous ink composition containing a metal-containing brilliant pigment having a predetermined range of a particle size can solve the above problem. Specifically, the present invention provides the following aspects.

(1) A non-aqueous ink composition to be discharged by an inkjet method, the composition including:
an organic solvent; and
a brilliant pigment,
    the brilliant pigment containing a metal-containing brilliant pigment, the metal-containing brilliant pigment having a volume-based cumulative 10% particle size (D10) (μm), a volume-based cumulative 50% particle size (D50) (μm), and a volume-based cumulative 90% particle size (D90) (μm) satisfying a relationship of Expression (1) below:

$$(D90 - D10)/D50 \leq 2 \qquad (1)$$

and the metal-containing brilliant pigment having the D90 of 5.0 μm or less (2) The non-aqueous ink composition according to (1), having the D90 in a range of 1.0 μm or more and 4.5 μm or less.

(3) The non-aqueous ink composition according to (1) or (2), having the D50 in a range of 0.5 μm or more and 3.0 μm or less.

(4) The non-aqueous ink composition according to any one of (1) to (3), in which the brilliant pigment is contained in a range of 0.3% by mass or more and 5.0% by mass or less relative to a total amount of the ink composition.

(5) A printed matter, including:
a substrate; and
    the non-aqueous ink composition according to any one of (1) to (4) applied on a surface of the substrate.

(6) A recording method including
discharging a non-aqueous ink composition by an inkjet method, the non-aqueous ink composition containing an organic solvent and a brilliant pigment, the brilliant pigment containing a metal-containing brilliant pigment, the metal-containing brilliant pigment having a volume-based cumulative 10% particle size (D10) (μm), a volume-based cumulative 50% particle size (D50) (μm), and a volume-based cumulative 90% particle size (D90) (μm) satisfying a relationship of Expression (1) below:

$$(D90 - D10)/D50 \leq 2 \qquad (1)$$

and the metal-containing brilliant pigment having the D90 of 5.0 µm or less.

(7) A method for producing a printed matter, the method including discharging a non-aqueous ink composition by an inkjet method, the composition including an organic solvent and a brilliant pigment, the brilliant pigment containing a metal-containing brilliant pigment, the metal-containing brilliant pigment having a volume-based cumulative 10% particle size (D10) (µm), a volume-based cumulative 50% particle size (D50) (µm), and a volume-based cumulative 90% particle size (D90) (µm) satisfying a relationship of Expression (1) below:

$$(D90 - D10)/D50 \le 2 \qquad (1)$$

and the metal-containing brilliant pigment having the D90 of 5.0 µm or less.

Effects of the Invention

The present invention can improve inkjet discharge stability even for a non-aqueous ink composition containing a metal-containing brilliant pigment. B

BRIEF DESCRIPTION OF THE DRAWINGS

FIG. 1 is a schematic diagram showing a measurement angle of L* (lightness index) in an L*a*b* colorimetric system for evaluation for luster of Examples.

PREFERRED MODE FOR CARRYING OUT THE INVENTION

Although specific embodiments of the present invention will be described hereafter in detail, the present invention is not limited to the embodiments in any way and can be implemented with modifications as appropriate within the scope of the object of the present invention. Note that, as used herein, "A B" means that A is equal to B or A is smaller than B (B is greater than A).

<1. Non-Aqueous Ink Composition>

A non-aqueous ink composition according to the present embodiment is a non-aqueous ink composition to be discharged by an inkjet method. When this non-aqueous ink composition is discharged on an object by an inkjet method, the non-aqueous ink composition is applied onto a surface of the object and thus can add metallic luster to the object. Note that, an object, as used herein, is not particularly limited, and may be a surface itself of a recording medium or a surface of a recording medium on which a colored ink composition or a primer has been partially or wholly applied.

As used herein, a non-aqueous ink composition refers to a water-free ink composition. As used herein, the term "water-free" refers to an ink composition produced without intentionally adding water. For example, water included due to a cause unintended by a manufacturer, such as water vapor contained in an atmosphere or water contained in an additive is not taken into account.

Furthermore, the non-aqueous ink composition means, unlike an active energy ray curable ink composition which is cured by irradiating the composition with an active energy ray, an ink composition from which a recorded matter can be obtained by drying an organic solvent mainly contained therein. Note that, the phrase "unlike an active energy ray curable ink composition" means that it is different from an ink composition from which a recorded matter can be obtained by irradiating the composition with an active energy ray, and, for example, does not mean that it excludes inclusion of a polymerizable compound having a multiple bond in an ink composition (non-aqueous ink composition) itself which is different from the active energy ray curable ink composition.

Next, components included in an non-aqueous ink composition according to the present embodiment will be described.

[Brilliant Pigment]

A brilliant pigment has a function of adding metallic luster to an object. The brilliant pigment may be, for example, those containing a pearl pigment or a metal-containing brilliant pigment. In the non-aqueous ink composition according to the present embodiment, the brilliant pigment contains a metal-containing brilliant pigment. Thus, the metallic luster may be added to the object.

Note that, when the brilliant pigment contains a metal-containing brilliant pigment, the metal-containing brilliant pigment is more preferably contained in an amount of 30% by mass or more, more preferably 50% by mass or more, and further preferably 70% by mass or more relative to a total amount of the brilliant pigment. The brilliant pigment is especially preferably the metal-containing brilliant pigment.

Examples of the pearl pigment include a pearlescent or interference-lustrous pigment such as mica, fish scale guanine, bismuth acid chloride, silicon dioxide, a metal oxide, a metal compound, and a laminate thereof.

Examples of a metal contained in the metal-containing brilliant pigment include at least one of single metal such as aluminum, silver, gold, nickel, chromium, tin, zinc, indium, titanium, or copper; a metal compound; an alloy; or a mixture thereof; or an oxide of the above-mentioned metal. The metal-containing brilliant pigment preferably contains aluminum, nickel, indium, or silver. Use of a brilliant pigment containing aluminum, nickel, indium, or silver (including an alloy thereof) allows for adding a more suitable metallic luster to an object. Aluminum is especially preferred since it is inexpensive and easy to process compared to other metals. The ink composition according to the present embodiment can have excellent dischargeability while exerting an effect of adding a more suitable metallic luster to an object.

Meanwhile, the metal-containing brilliant pigment contained in the ink composition according to the present embodiment is characterized by having a volume-based cumulative 10% particle size (D10) (µm), a volume-based cumulative 50% particle size (D50) (µm), and a volume-based cumulative 90% particle size (D90) (µm) satisfying a relationship of Expression (1) below:

$$(D90 - D10)/D50 \le 2 \qquad (1)$$

and having the volume-based cumulative 90% particle size (D90) of 5.0 µm or less.

The present inventors have found that a non-aqueous ink composition containing the metal-containing brilliant pigment satisfying the relationship has better inkjet dischargeability. The brilliant pigment is tabular (may be expressed as fine tabular, scaly, etc.). An ink composition containing such a tabular brilliant pigment may have poor dischargeability due to insufficient transmission (also referred to as pressure drop) of pressure applied to the ink composition in an inkjet head for discharging an ink or alternatively cause a discharge failure due to an inkjet nozzle or a filter in an inkjet head clogged with a brilliant pigment having a large particle size.

Therefore, the present inventors have found that an ink composition that contains a metal-containing brilliant pigment having a volume-based cumulative 10% particle size (D10) (μm), a volume-based cumulative 50% particle size (D50) (μm), and a volume-based cumulative 90% particle size (D90) (μm) satisfying a relationship of Expression (1) below:

$$(D90 - D10)/D50 \le 2 \qquad (1)$$

and having the volume-based cumulative 90% particle size (D90) of 5.0 μm or less is stably discharged.

Note that, the volume-based cumulative 10% particle size (D10), as used herein, means a particle size (μm) that is 10% by cumulative volume as counted from the smallest particle size side in a volume-based cumulative particle size distribution; the volume-based cumulative 50% particle size (D50) means a particle size (μm) that is 50% by cumulative volume as counted from the smallest particle size side in a volume-based cumulative particle size distribution; and the volume-based cumulative 90% particle size (D90) means a particle size (μm) that is 90% by cumulative volume as counted from the smallest particle size side in a volume-based cumulative particle size distribution. Furthermore, the volume-based cumulative 50% particle size (D50) may be referred to as "volume average particle size", "average particle size", or "median size". Hereinafter, the particle sizes may be referred to simply as "D10", "D50", and "D90", respectively.

The D10, the D50, the D90, and a thickness of the metal-containing brilliant pigment can be measured using, for example, "FPIA-3000S" (manufactured by SYSMEX CORPORATION), a laser diffraction particle size analyzer "SALD 7500nano" (manufactured by SHIMADZU CORPORATION), a scanning electron microscope (SEM), or a transmission electron microscope (TEM).

In Expression (1), a value of (D90–D10)/D50 is preferably 1.8 or less, more preferably 1.6 or less, further preferably 1.5 or less, and even further preferably 1.4 or less. An ink composition having such a value can have a further improved discharge stability.

In Expression (1), a value of (D90–D10)/D50 is preferably 0.1 or more, more preferably 0.3 or more, and further preferably 0.5 or more.

The D90 is not particularly limited as long as it is 5.0 μm or less, but is preferably 4.5 μm or less, more preferably 4.0 μm or less, and further preferably 3.8 μm or less.

The D90 is preferably 0.5 μm or more, more preferably 0.8 μm or more, and further preferably 1.0 μm or more.

The D50 is preferably 0.02 μm or more, more preferably 0.3 μm or more, and further preferably 0.6 μm or more.

The D50 is preferably 4.0 μm or less, more preferably 3.5 μm or less, and further preferably 2.9 μm or less.

Furthermore, the metal-containing brilliant pigment is preferably tabular (may be expressed as fine tabular, scaly, etc.). Such a shape can add suitable metallic luster to an object. In the case of a tabular metal-containing brilliant pigment, a thickness of the metal-containing brilliant pigment is preferably 5.0 nm or more, more preferably 8.0 nm or more, and further preferably 10.0 nm or more. Furthermore, the thickness of the metal-containing brilliant pigment is preferably 3.0 μm or less and further preferably 1.5 μm or less.

A content of the brilliant pigment contained in the non-aqueous ink composition according to the present embodiment is not particularly limited, but a lower limit of the content of the brilliant pigment is preferably 0.3% by mass or more, more preferably 0.6% by mass or more, and further preferably 0.8% by mass or more relative to a total amount of the ink composition. Such a content can add a more suitable metallic luster to an object. An upper limit of the content of the brilliant pigment is not particularly limited, but is preferably 5.0% by mass or less, more preferably 4.5% by mass or less, and further preferably 4.0% by mass or less relative to a total amount of the ink composition. Such a content allows the brilliant pigment to be better dispersed in an ink composition or a dispersion liquid and can improve inkjet discharge stability.

The brilliant pigment can be obtained by mechanically shaping metal-containing particles, for example, by milling the metal-containing particles in a ball mill or an attrition mill. The metal-containing particles can also be obtained by a known atomizing method.

Furthermore, as another method for producing the brilliant pigment, a metal-containing thin film formed on a substrate may be pulverized. By way of example, such a method may be, for example, a method in which a metal-containing thin film of about 5 nm or more and about 3.0 μm or less is formed by vacuum deposition, ion plating, or a sputtering method, etc. on a flat substrate on which a releasing resin layer has been applied; released from the substrate; and pulverized. Note that, the phrase "metal-containing thin film" is used based on the concept that also includes a thin film containing a metal compound such as a metal oxide. A lower limit of a thickness of the metal-containing thin film is preferably 5 nm or more, more preferably 10 nm or more, and further preferably 15 nm or more. An upper limit of a thickness of the metal-containing thin film is preferably 5.0 μm or less, more preferably 3.0 μm or less, and further preferably 1.0 μm or less.

Specific examples of a substrate to be used for producing the brilliant pigment include a polytetrafluoroethylene film; a polyethylene film; a polypropylene film; a polyester film such as polyethylene terephthalate; a polyamide film such as nylon 66 or nylon 6; a polycarbonate film; a triacetate film; or a polyimide film. The substrate is preferably a film made of polyethylene terephthalate or a copolymer thereof.

A lower limit of a preferred thickness of the substrate to be used for producing the brilliant pigment is not particularly limited, but is preferably 10 μm or more, more preferably 15 μm or more, and further preferably 20 μm or more. A substrate having a thickness of 10 μm or more has good handleability. An upper limit of a preferred thickness of the substrate is not particularly limited, but is preferably 150 μm or less, more preferably 145 μm or less, and further preferably 140 μm or less. A substrate having a thickness of 150 μm or less enables a printed matter with improved flexibility, which allows the printed matter to be easily rolled or released.

Specific examples of a resin to be used for the releasing resin layer to be applied on the substrate include polyvinyl alcohol, polyvinyl butyral, polyethylene glycol, polyacrylic acid, polyacrylamide, a cellulose derivative, polyvinyl acetal, an acrylic acid copolymer, or a modified nylon resin. The resin to be used for the releasing resin layer is formed into a resin layer by applying a resin solution on a sheet substrate using gravure coating, roll coating, blade coating, extrusion coating, dip coating, spin coating, etc. to thereby form a releasing resin layer.

A lower limit of a thickness of the releasing resin layer is not particularly limited, but is preferably 0.1 μm or more, more preferably 0.3 μm or more, and further preferably 0.5 μm or more. A releasing resin layer having a thickness of 0.1 μm or more allows the metal-containing thin film to be easily released from the substrate. An upper limit of a thickness of the releasing resin layer is not particularly limited, but is preferably 50 μm or less, more preferably 30 μm or less, and further preferably 10 μm or less. A releasing resin layer having a thickness of 50 μm or less allows the metal-containing thin film to be easily released from the substrate.

Note that, a dispersion liquid to be used for the ink composition or producing the ink composition may be produced from a substrate on which the metal-containing thin film has been formed. The substrate may be dipped into a solvent into which a releasing resin can be dissolved and which is not reactive with the brilliant pigment and optionally sonicated simultaneously. Examples of such a solvent include a polymerizable compound or a solvent included in the ink composition. The releasing resin acts as a dispersing agent for dispersing the brilliant pigment to thereby improve dispersibility of the brilliant pigment. In this case, a particle size and a film thickness of the brilliant pigment are adjusted by conditions for forming the metal-containing thin film or an ultrasonic dispersion time. Note that, the brilliant pigment may be settled from a solution in which the releasing resin is dissolved by centrifugation, collected, and then dispersed in a polymerizable compound or a solvent included in the ink composition.

A protective layer may be formed on a surface of the brilliant pigment, in other words, a surface of the brilliant pigment may be covered with a protective layer. The protective layer is preferably a non-metallic protective layer. The non-metallic protective layer may be, for example, a layer composed of a hydrophobic compound such as a resin or a fatty acid compound. Examples thereof include a fatty acid, a fatty acid ester, an aromatic carboxylic acid, an aromatic carboxylic acid ester, a phosphoric acid ester, a silicon-containing polymer, a fluorine-containing polymer, a polyester resin, an acrylic resin, an epoxy resin, a urethane resin, a cellulose ester resin, etc. Especially when the brilliant pigment contains aluminum, the protective layer is preferably composed of a hydrophobic compound. The hydrophobic compound may be, for example, a water-insoluble compound having a structure such as a C4 or more alkyl group, an aromatic group, or a trifluoro group, and the above-described resin, etc. The protective layer formed on a surface of the brilliant pigment can prevent the brilliant pigment from oxidizing, resulting in an ink composition having a high storage stability.

In this case, the metal-containing brilliant pigment is adjusted to have a particle size so that a value of (D90–D10)/D50 is 2 or less and the D90 is 5.0 μm or less. A method for obtaining a metal-containing brilliant pigment having a particle size satisfying such a relationship may be, for example, a method in which a particle size is adjusted by controlling time and a dose when a dispersion liquid containing the metal-containing brilliant pigment is sonicated; a method in which a metal-containing brilliant pigment having a particle size equal to or larger than a predetermined particle size is removed by centrifugation or filtering; or a combination thereof.

Note that, the non-aqueous ink composition according to the present embodiment may contain a color material other than the brilliant pigment.

[Pigment Dispersing Agent]

A pigment dispersing agent may be used for the non-aqueous ink composition according to the present embodiment, as necessary. The dispersing agent may be any pigment dispersing agent conventionally used in the non-aqueous ink composition. The pigment dispersing agent may be a polymer dispersing agent. Examples of such a dispersing agent include those having a polyester-, polyacrylic-, polyurethane-, polyamine-, or polycaprolactone-main chain and a polar group such as an amino group, a carboxyl group, a sulfone group, or a hydroxyl group in its side chain. Examples of a polyacrylic dispersing agent include Disperbyk-2000, 2001, 2008, 2009, 2010, 2020, 2020N, 2022, 2025, 2050, 2070, 2095, 2150, 2151, 2155, 2163, or 2164, BYKJET-9130, 9131, 9132, 9133, or 9151 (manufactured by BYK-Chemie), Efka PX4310, PX4320, PX4330, PA4401, 4402, PA4403, 4570, 7411, 7477, PX4700, or PX4701 (manufactured by BASF), TREPLUS D-1200, D-1410, D-1420, or MD-1000 (manufactured by Otsuka Chemical Co., Ltd.), or FLOWLEN DOPA-15BHFS, 17HF, 22, G-700, 900, NC-500, or GW-1500 (manufactured by KYOEISHA CHEMICAL Co., LTD.), etc. Examples of a polycaprolactone dispersing agent include AJISPER PB821, PB822, or PB881 (manufactured by Ajinomoto Fine-Techno Co., Inc.), Hinoact KF-1000, T-6000, T-7000, T-8000, T-8000E, or T-9050 (manufactured by Kawaken Fine Chemicals Co., Ltd.), Solsperse 20000, 24000, 32000, 32500, 32550, 32600, 33000, 33500, 34000, 35200, 36000, 37500, 39000, 47000, 71000, 76400, 76500, 86000, 88000, J180, or J200 (manufactured by Lubrizol Corporation), TEGO Dispers 652, 655, 685, 688, or 690 (manufactured by Evonik Industries) For example, BYKJET-9130, 9131, 9132, 9133, or 9151, Efka PX4310, PX4320, PX4330, PX4700, or PX4701, Solsperse 20000, 24000, 32000, 33000, 33500, 34000, 35200, 39000, 47000, 71000, 76500, 86000, 88000, J180, or J200, or TEGO Dispers 655, 685, 688, or 690 are preferably used as the dispersing agent. These may be used alone or as a mixture thereof.

A content of the pigment dispersing agent is not particularly limited, but a lower limit of the content of the pigment dispersing agent is preferably 5 parts by mass or more, more preferably 10 parts by mass or more, and further preferably 15 parts by mass or more relative to 100 parts by mass of a pigment in the non-aqueous ink composition. An upper limit of the content of the pigment dispersing agent is preferably 150 parts by mass or less, more preferably 125 parts by mass or less, and further preferably 100 parts by mass or less relative to 100 parts by mass of a pigment in the non-aqueous ink composition.

[Organic Solvent]

An organic solvent may be the same organic solvent as one contained in a non-aqueous ink composition discharged by a conventional inkjet method. Specific examples thereof include glycol ether dialkyl in which OH groups at both ends of glycol are substituted with alkyl groups, glycol ether monoalkyl in which an OH group at one end of glycol is substituted with an alkyl group, or glycol ester in which an OH group is substituted with an ester group.

The glycol ether dialkyl may be, for example, glycol ether dialkyl represented by Formula (1) below:

(Chem. 1)

$$R_1{-}({-}O{-}R_2{-})_n{-}O{-}R_3 \qquad (1)$$

in which $R_1$ denotes an optionally branched alkyl group having 1 to 8 carbon atoms, $R_2$ denotes an optionally branched alkylene group having 1 to 4 carbon atoms, $R_3$ denotes an optionally branched alkyl group having 1 to 8 carbon atoms, and n denotes an integer of 1 or more and 6 or less.

Note that, $R_1$ is preferably an optionally branched alkyl group having 1 to 4 carbon atoms. $R_2$ is preferably an optionally branched alkylene group having 1 to 3 carbon atoms. $R_3$ is preferably hydrogen or an optionally branched alkyl group having 1 to 4 carbon atoms.

n is preferably an integer of 1 or more and 4 or less.

Examples of the organic solvent represented by Formula (1) include an alkylene glycol monoalkyl ether such as ethylene glycol mono-n-butyl ether, ethylene glycol mono-isobutyl ether, ethylene glycol mono-t-butyl ether, ethylene glycol mono-2-ethylhexyl ether, diethylene glycol monomethyl (or ethyl, propyl, isopropyl, n-butyl, isobutyl, t-butyl, 2-ethylhexyl) ether, triethylene glycol monomethyl (or ethyl, propyl, isopropyl, n-butyl, isobutyl, t-butyl, 2-ethylhexyl) ether, tetraethylene glycol monomethyl ether, propylene glycol mono-n-butyl ether, propylene glycol mono-isobutyl ether, propylene glycol mono-t-butyl ether, propylene glycol mono-2-ethylhexyl ether, dipropylene glycol monomethyl (or ethyl, propyl, isopropyl, n-butyl, isobutyl, t-butyl, 2-ethylhexyl) ether, tripropylene glycol monomethyl (or ethyl, propyl, isopropyl, n-butyl, isobutyl, t-butyl) ether, or tetrapropylene glycol monomethyl ether (or ethyl, propyl, isopropyl, n-butyl, isobutyl, t-butyl, 2-ethylhexyl); or a dialkyl ether of a polyhydric alcohol such as ethylene glycol dibutyl ether, ethylene glycol dipropyl ether, diethylene glycol dimethyl ether, diethylene glycol diethyl ether, diethylene glycol methyl ethyl ether, diethylene glycol dipropyl ether, diethylene glycol propyl methyl ether, diethylene glycol dibutyl ether, diethylene glycol butyl methyl ether, diethylene glycol butyl ethyl ether, diethylene glycol methyl-2-ethylhexyl ether, triethylene glycol dimethyl ether, triethylene glycol diethyl ether, triethylene glycol ethyl methyl ether, tetraethylene glycol dimethyl ether, tetraethylene glycol diethyl ether, tetraethylene glycol ethyl methyl ether, propylene glycol diethyl ether, propylene glycol ethyl methyl ether, propylene glycol methyl propyl ether, propylene glycol methyl butyl ether, propylene glycol methyl-2-ethylhexyl ether, dipropylene glycol dimethyl ether, dipropylene glycol diethyl ether, dipropylene glycol ethyl methyl ether, dipropylene glycol methyl propyl ether, dipropylene glycol dipropyl ether, dipropylene glycol methyl butyl ether, tripropylene glycol dimethyl ether, tripropylene glycol diethyl ether, or tripropylene glycol ethyl methyl ether.

From the viewpoints of permeability of a non-aqueous ink composition into a substrate onto which the ink composition has been discharged and a leveling property or a drying property of the non-aqueous ink composition on a surface of the substrate, diethylene glycol dimethyl ether, diethylene glycol diethyl ether, diethylene glycol ethyl methyl ether, diethylene glycol dipropyl ether, diethylene glycol propyl methyl ether, diethylene glycol dibutyl ether, diethylene glycol butyl methyl ether, diethylene glycol butyl ethyl ether, diethylene glycol methyl-2-ethylhexyl ether, triethylene glycol dimethyl ether, triethylene glycol diethyl ether, triethylene glycol ethyl methyl ether, tetraethylene glycol dimethyl ether, propylene glycol diethyl ether, propylene glycol ethyl methyl ether, propylene glycol methyl propyl ether, propylene glycol methyl butyl ether, propylene glycol methyl-2-ethylhexyl ether, dipropylene glycol dimethyl ether, dipropylene glycol diethyl ether, dipropylene glycol ethyl methyl ether, dipropylene glycol methyl propyl ether, dipropylene glycol dipropyl ether, tripropylene glycol dimethyl ether, tripropylene glycol ethyl methyl ether, etc. are preferably used.

Furthermore, a mixture of two or more of the above-described organic solvent may also be used. For example, a non-aqueous ink composition containing a first organic solvent having a flashing point of 70° C. or less and represented by General Formula (1) and a second organic solvent having a flashing point of 90° C. or more and represented by Formula (1) may be used. When such a mixture of the first organic solvent and the second organic solvent is contained, the non-aqueous ink composition can wet, spread, and dry well on the substrate, thereby adding a more suitable metallic luster to an object.

Examples of the first organic solvent include diethylene glycol methyl ethyl ether, diethylene glycol dimethyl ether, dipropylene glycol dimethyl ether, or diethylene glycol isopropyl methyl ether. Examples of the second organic solvent include diethylene glycol diethyl ether, diethylene glycol butyl methyl ether, tetraethylene glycol monobutyl ether, diethylene glycol monomethyl ether, diethylene glycol monoethyl ether, diethylene glycol monoisopropyl ether, diethylene glycol monohexyl ether, diethylene glycol dibutyl ether, dipropylene glycol monopropyl ether, dipropylene glycol monobutyl ether, triethylene glycol monomethyl ether, triethylene glycol monobutyl ether, triethylene glycol dimethyl ether, tripropylene glycol monomethyl ether, tripropylene glycol monobutyl ether, tripropylene glycol dimethyl ether, or tetraethylene glycol dimethyl ether.

Furthermore, the organic solvent contained in the non-aqueous ink composition according to the present embodiment may contain an organic solvent other than the organic solvent represented by Formula (1) below. Examples thereof include common organic solvents, for example, an alkyl alcohol having 1 to 5 carbon atoms such as methyl alcohol, ethyl alcohol, n-propyl alcohol, isopropyl alcohol, n-butyl alcohol, sec-butyl alcohol, tert-butyl alcohol, isobutyl alcohol, or n-pentanol; a monohydric alcohol such as 3-methoxy-3-methyl-1-butanol, 3-methoxy-1-propanol, 1-methoxy-2-propanol, or 3-methoxy-n-butanol; an ether such as tetrahydrofuran, dioxane, or dibutyl ether; an oxyethylene or oxypropylene copolymer such as polyethylene glycol or polypropylene glycol; a diol such as ethylene glycol, propylene glycol, diethylene glycol, dipropylene glycol, 1,3-propanediol, isobutylene glycol, triethylene glycol, tripropylene glycol, tetraethylene glycol, 1,3-propanediol, 2-methyl-1,2-propanediol, 2-methyl-1,2-propanediol, 1,2-butanediol, 1,3-butanediol, 1,4-butanediol, 1,2-pentanediol, 1,2-hexanediol, 1,5-pentanediol, 1,6-hexanediol, 2-methyl-2,4-pentanediol, 3-methyl-1,3-butanediol, 3-methyl-1,5-pentanediol, or 2-methyl-2,4-pentanediol; a triol such as glycerin, trimethylolethane, trimethylolpropane, or 1,2,6-hexantriol; a tetrahydric alcohol such as mesoerythritol or pentaerythritol; a ketone or a ketoalcohol such as acetone, methyl ethyl ketone, methyl-n-propyl ketone, methyl isopropyl ketone, methyl-n-butyl ketone, methyl isobutyl ketone, methyl-n-amyl ketone, methyl iso-amyl ketone, diethyl ketone, ethyl-n-propyl ketone, ethyl isopropyl ketone, ethyl-n-butyl ketone, ethyl isobutyl ketone, di-n-propyl ketone, diisobutyl ketone, cyclopentanone, cyclohexanone, methyl cyclohexanone, isophorone, or acetyl ketone; an alkanol amine such as monoethanolamine, diethanolamine, triethanolamine, N-methyl ethanolamine, N-ethyl ethanolamine, N-butyl ethanolamine, N-methyl diethanolamine, N-ethyl diethanolamine, or N-butyl diethanolamine; an acetic acid ester such as methyl acetate, ethyl acetate, n-propyl acetate, isopropyl acetate, n-butyl acetate, isobutyl acetate, hexyl acetate, or octyl acetate; a lactic acid ester such as methyl lactate, ethyl lactate, butyl lactate, propyl lactate, ethylhexyl lactate, amyl lactate, or isoamyl lactate; a dibasic acid ester such as dimethyl oxalate, diethyl oxalate, dimethyl malonate, diethyl malonate, dipropyl malonate, dimethyl succinate, diethyl succinate, dimethyl glutarate, or diethyl glutarate; an acetate such as ethylene glycol monomethyl (or ethyl, propyl, isopropyl, n-butyl, isobutyl, t-butyl, pentyl, n-hexyl, 2-ethylhexyl) ether acetate, diethylene glycol monomethyl (or ethyl, propyl, isopropyl, n-butyl, isobutyl, t-butyl, pentyl, n-hexyl, 2-ethylhexyl) ether acetate, triethylene glycol monomethyl (or ethyl, propyl, isopropyl, n-butyl, isobutyl, t-butyl, pentyl, n-hexyl, 2-ethylhexyl) ether acetate, propylene glycol monomethyl (or ethyl, propyl, isopropyl, n-butyl, isobutyl, t-butyl, pentyl, n-hexyl, 2-ethylhexyl) ether acetate, dipropylene glycol monomethyl (or ethyl, propyl, isopropyl, n-butyl, isobutyl, t-butyl, pentyl, n-hexyl, 2-ethylhexyl) ether acetate, tripropylene glycol monomethyl (or ethyl, propyl, isopropyl, n-butyl, isobutyl, t-butyl, pentyl, n-hexyl, 2-ethylhexyl) ether acetate, ethylene glycol diacetate, diethylene glycol diacetate, propylene glycol diacetate, dipropylene glycol diacetate, 1-methoxy-2-propyl acetate, 3-methoxybutyl acetate, 2-methylbutyl acetate, 3-methoxybutyl ether acetate, or cyclohexyl acetate; a saturated hydrocarbon such as n-hexane, isohexane, n-nonane, isononane, dodecane, or isododecane; an unsaturated hydrocarbon such as 1-hexene, 1-heptene, or 1-octene; a cyclic saturated hydrocarbon such as cyclohexane, cycloheptane, cyclooctane, cyclodecane, or decalin; a cyclic unsaturated hydrocarbon such as cyclohexene, cycloheptene, cyclooctene, 1,1,3,5,7-cyclooctatetraene, or cyclododecene; an aromatic hydrocarbon such as benzene, toluene, or xylene; a morpholine such as N-methylmorpholine, N-ethylmorpholine, or N-formylmorpholine; a terpene solvent, a cyclic imide, etc. Depending on a resin or a dispersing agent to be combined, a solvent having an appropriate HLB value is preferably selected.

Furthermore, a heterocyclic compound such as a cyclic ester organic solvent or a cyclic amide organic solvent; or an alkyl amide organic solvent containing one carboxylic amide structure in a molecular structure thereof is preferably contained. Such a cyclic ester organic solvent or amide organic solvent has a large value of energy op due to intermolecular dipole interaction which is one of Hansen solubility parameters, and intramolecular polarity. Therefore, inclusion of these organic solvents can improve dispersibility of the metal-containing brilliant pigment of which particle size is controlled in a predetermined range, making it possible to further improve inkjet discharge stability.

Examples of the cyclic ester organic solvent include a lactone organic solvent such as γ-butyrolactone, γ-valerolactone, γ-hexalactone, γ-heptalactone, γ-octalactone, γ-nonalactone, γ-decalactone, γ-undecalactone, δ-valerolactone, δ-hexalactone, δ-heptalactone, δ-octalactone, δ-nonalactone, δ-decalactone, δ-undecalactone, ε-caprolactone; or a carboxylic acid ester organic solvent such as ethylene carbonate or propylene carbonate. Note that, the cyclic ester organic solvent may be a mixture of two or more cyclic esters.

Examples of the cyclic amide organic solvent include an oxazolidinone solvent such as 3-methyl-2-oxazolidinone, 3-ethyl-2-oxazolidinone, or N-vinyl methyl oxazolidinone; an imidazolidinone solvent such as 1,3-dimethyl-2-imidazolidinone, 1-methyl-3-ethyl-2-imidazolidinone, or 1,3-diethyl-2-imidazolidinone; N-methylcaprolactam, N-ethylcaprolactam, N-acetylcaprolactam, ε-caprolactam, N-vinylcaprolactam, 2-pyrrolidone, N-methyl-2-pyrrolidone, N-ethyl-2-pyrrolidone, N-propyl-2-pyrrolidone, N-ethyl-ε-caprolactam, N-propyl-ε-caprolactam, or N-methyl-ε-caprolactam.

Examples of the alkylamide organic solvent include an alkoxyamide solvent such as 3-methoxy propanamide, 3-butoxy propanamide, N,N-dimethyl-3-methoxy propanamide, N,N-dibutyl-3-methoxy propanamide, N,N-dibutyl-3-butoxy propanamide, or N,N-dimethyl-3-butoxy propanamide; formamide, acetamide, propanamide, butanamide, isobutylamide, pentanamide, N-methylformamide, N-methylacetamide, N-methylpropanamide, N-methylbutanamide, N-methylisobutylamide, N-methylpentanamide, N-ethylformamide, N-ethylacetamide, N-ethylpropanamide, N-ethylbutanamide, N-ethylisobutylamide, N-ethylpentanamide, N-propylformamide, N-propylacetamide, N-propylpropanamide, N-propylbutanamide, N-propylisobutylamide, N-propylpentanamide, N-isopropylformamide, N-isopropylacetamide, N-isopropylpropanamide, N-isopropylbutanamide, N-isopropylisobutylamide, N-isopropylpentanamide, N-butylformamide, N-butylacetamide, N-butylpropanamide, N-butylbutanamide, N-butylisobutylamide, N-butylpentanamide, N,N-dimethylformamide, N,N-dimethylacetamide, N,N-dimethylpropanamide, N,N-dimethylbutanamide, N,N-dimethylisobutylamide, N,N-dimethylpentanamide, N,N-diethylformamide, N,N-diethylacetamide, N,N-diethylpropanamide, N,N-diethylbutanamide, N,N-diethylisobutylamide, N,N-diethylpentanamide, N,N-dipropylformamide, N,N-dipropylacetamide, N,N-dipropylpropanamide, N,N-dipropylbutanamide, N,N-dipropylisobutylamide, N,N-dipropylpentanamide, N,N-diisopropylformamide, N,N-diisopropylacetamide, N,N-diisopropylpropanamide, N,N-diisopropylbutanamide, N,N-diisopropylisobutylamide, N,N-diisopropylpentanamide, N,N-dibutylformamide, N,N-dibutylacetamide, N,N-dibutylpropanamide, N,N-dibutylbutanamide, N,N-dibutylisobutylamide, N,N-dibutylpentanamide, N-ethyl-N-methylformamide, N-ethyl-N-methylacetamide, N-ethyl-N-methylpropanamide, N-ethyl-N-methylbutanamide, N-ethyl-N-methylisobutylamide, N-ethyl-N-methylpentanamide, N-methyl-N-propylformamide, N-methyl-N-propylacetamide, N-methyl-N-propylpropanamide, N-methyl-N-propylbutanamide, N-methyl-N-propylisobutylamide, N-methyl-N-propylpentanamide, N-ethyl-N-propylformamide, N-ethyl-N-propylacetamide, N-ethyl-N-propylpropanamide, N-ethyl-N-propylbutanamide, N-ethyl-N-propylisobutylamide, N-ethyl-N-propylpentanamide, etc.

A content of the cyclic ester organic solvent, the cyclic amide organic solvent, and the amide organic solvent is preferably 5% by mass or more and more preferably 10% by mass or more relative to a total amount of the non-aqueous ink composition. The content of the cyclic ester organic solvent, the cyclic amide organic solvent, and the amide organic solvent is preferably 60% by mass or less and more preferably 50% by mass or less relative to a total amount of the non-aqueous ink composition. The content of the cyclic ester organic solvent, the cyclic amide organic solvent, and the amide organic solvent falling within the above-described range allows the ink composition to permeate a surface of an object (e.g., a substrate, a receiving layer, a surface onto which a colored ink composition is applied, etc.) to improve fixability.

Note that, a solvent having a boiling point of 280° C. or more is preferably contained in an amount of 5% by mass or less, further preferably 3% by mass or less, and further more preferably 1% by mass or less relative to a total amount of the ink composition since a drying property after printing or fixability or adhesion of the ink composition on a substrate deteriorates.

[Resin]

A non-aqueous ink composition according to the present embodiment may contain a resin (binder resin), as necessary. The non-aqueous ink composition according to the present embodiment containing the resin can have improved fixability, water resistance, extensibility, luster, and abrasion resistance.

The resin is not particularly limited. For example, an acrylic resin (including a copolymer thereof such as a styrene-acrylic resin), a polystyrene resin, a polyester resin, a vinyl chloride resin, a vinyl acetate resin, a vinyl chloride-vinyl acetate copolymer resin, a polyethylene resin, a poly-urethane resin, a rosin-modified resin, a phenolic resin, a terpene resin, a polyamide resin, a vinyl toluene-α-methyl styrene copolymer, an ethylene-vinyl acetate copolymer, cellulose acetate butyrate, cellulose acetate propionate, a silicone (silicon) resin, an acrylamide resin, an epoxy resin, or a copolymer resin or mixture thereof may be used. Among them, those containing an acrylic resin, a vinyl chloride resin, a cellulose resin, a polyester resin, or a polyurethane resin are preferred and those containing an acrylic resin, a vinyl chloride resin, or a cellulose resin are more preferred.

The acrylic resin is not particularly limited, as long as it contains a monomer constituting a (meth)acrylic ester monomer as a main component. The acrylic resin may be a homopolymer of one radical polymerizable monomer or a copolymer of two or more radical polymerizable monomers. In particular, an acrylic resin suitable for the non-aqueous ink composition according to the present embodiment is a homopolymer of methyl methacrylate or a copolymer of methyl methacrylate and at least one or more compounds selected from the group consisting of butyl methacrylate, ethoxyethyl methacrylate, or benzyl methacrylate. Furthermore, a commercially available (meth)acrylic resin is exemplified by "Paraloid B99N", "Paraloid B60", "Paraloid B66", "Paraloid B82", etc. manufactured by Rohm and Haas Company.

The vinyl chloride resin may be a homopolymer of a vinyl chloride monomer or a copolymer of two or more polym-erizable monomers. The copolymer for the vinyl chloride resin is, for example, a vinyl chloride-vinyl acetate copoly-mer resin. The vinyl chloride-vinyl acetate copolymer resin is a polymer of a vinyl chloride monomer and a vinyl acetate monomer. Examples of the vinyl chloride-vinyl acetate copolymer resin include a vinyl chloride/vinyl acetate copo-lymer, a vinyl chloride/vinyl acetate/maleic acid copolymer, a vinyl chloride/vinyl acetate/vinyl alcohol copolymer, a vinyl chloride/vinyl acetate/hydroxyalkyl acrylate copoly-mer, and a mixture thereof. The vinyl chloride-vinyl acetate copolymer resin may be obtained by polymerizing a vinyl chloride monomer and a vinyl acetate monomer. The method for polymerizing may be a conventionally known polymer-ization method. The method for polymerizing is preferably emulsion polymerization or suspension polymerization, with suspension polymerization being more preferred. The above-described vinyl chloride-vinyl acetate copolymer resin may be available from Nissin Chemical Co., Ltd. under the trademark of "SOLBIN C", "SOLBIN CL", "SOLBIN CNL", "SOLBIN CLL", "SOLBIN CLL2", "SOLBIN C5R", "SOLBIN TA2", "SOLBIN TA3", "SOLBIN A", "SOLBIN AL", "SOLBIN TA5R", or "SOLBIN M5", etc.

The cellulose resin is a resin having a cellulose backbone that is obtained by biologically or chemically introducing a functional group in cellulose serving as a raw material.

Examples of the cellulose resin include a cellulose acetate alkylate resin such as a cellulose acetate butylate resin, a cellulose acetate propionate resin, or a cellulose acetate propionate butylate resin; a cellulose acetate resin, a nitro-cellulose resin, and a mixture thereof. The above-described cellulose resin may be available from Eastman Chemical Company under the trademark of "CAB551-0.01", "CAB551-0.2", "CAB553-0.4", "CAB531-1", "CAB381-0.1", "CAB381-0.5", "CAB381-2", "CAB381-20", "CAP504", or "CAP482-0.5", etc.

The polyester resin is a resin including at least a building block obtained by polycondensing an alcohol component and a carboxylic acid component. The polyester resin may include a modified polyester resin. The polyester resin may be available from TOYOBO CO., LTD. under the trademark of "VYLON 226", "VYLON 270", "VYLON 560", "VYLON 600", "VYLON 630", "VYLON 660", "VYLON 885", "VYLON GK250", "VYLON GK810", or "VYLON GK890" or from UNITIKA LTD. under the trademark of "elitle UE-3200", "elitle UE-3285", "elitle UE-3320", "elitle UE-9800", or "elitle Ue-9885", etc.

The polyurethane resin is a resin including at least a building block obtained by copolymerizing an alcohol com-ponent and an isocyanate component. The polyurethane resin may include a polyurethane resin modified with poly-ester, polyether, or caprolactone. The above-described poly-urethane resin may be available from ARAKAWA CHEMI-CAL INDUSTRIES, LTD. under the trademark of "UREARNO KL-424", "UREARNO KL-564", "URE-ARNO KL-593", or "UREARNO 3262", or from DIC Corporation under the trademark of "PANDEX 372E", "PANDEX 390E", "PANDEX 394E", "PANDEX 304", "PANDEX 305E", "PANDEX P-870", "PANDEX P-910", "PANDEX P-895", "PANDEX 4030", or "PANDEX 4110", etc.

The acrylic resin, the vinyl chloride resin, the cellulose resin, the polyester resin, or the polyurethane resin may be used alone, but is preferably used as a mixture of two or more thereof, with a mixture of an acrylic resin and a vinyl chloride resin being more preferred. Requirements such as color development, a drying property, a coating physical property, or printing suitability demanded for the non-aqueous ink composition can be met by controlling a content ratio of the acrylic resin and the vinyl chloride resin. In the case of mixing the acrylic resin with the vinyl chloride resin, a mixing ratio is not particularly limited and may be appro-priately varied.

Furthermore, these resins have preferably a weight aver-age molecular weight of 10,000 or more, more preferably 15,000 or more, further preferably 20,000 or more, and further preferably 25,000 or more. Such a weight average molecular weight enables good abrasion resistance on a printed surface of the resulting printed matter. The molecular weight of the resin is preferably 20,000 or more, more preferably 25,000 or more, and further preferably 30,000 or more in terms of an absolute molecular weight |Mw|. When such a resin is contained, properties demanded for the non-aqueous ink composition to be discharged by an inkjet method can be achieved.

For the non-aqueous ink composition according to the present embodiment, a content of the resin (% by mass) included in 100% by mass of the non-aqueous ink compo-sition is not particularly limited. In particular, a lower limit of the content of the resin is preferably 0.05% by mass or more, more preferably 0.1% by mass or more, further preferably 0.2% by mass or more, and more preferably 0.3% by mass or more relative to a total amount of the non-aqueous ink composition. Such a content can more effectively improve fixability, water resistance, extensibility, luster, and abrasion resistance. An upper limit of the content of the resin is preferably 5.0% by mass or less, more preferably 3.0% by mass or less, and particularly preferably 2.0% by mass or less relative to a total amount of the non-aqueous ink composition. Such a content can more effectively improve inkjet discharge stability.

[Surfactant]

A surfactant may be added to the non-aqueous ink composition according to the present embodiment for the purpose of preventing the non-aqueous ink composition from volatilizing or solidifying in a device, for example, a nozzle portion or a tube, for the purpose of redissolving the non-aqueous ink composition when solidified, for the purpose of reducing surface tension to improve wettability on a recording medium (substrate), for the purpose of preventing the ink composition from bleeding on a substrate, for the purpose of improving abrasion resistance of a coating, or for the purpose of further improving luster on a recorded matter. Note that, the surfactant includes those referred to as a surface regulating agent, a leveling agent, an anti-foaming agent, etc.

Examples of the surfactant include a polyoxyalkylene alkyl ether NONION P-208, P-210, P-213, E-202S, E-205S, E-215, K-204, K-220, S-207, S-215, A-10R, A-13P, NC-203, or NC-207 (manufactured by NOF CORPORATION), EMULGEN 106, 108, 707, 709, A-90, or A-60 (manufactured by Kao Corporation), FLOWLEN G-70, D-90, or TG-740W (manufactured by KYOEISHA CHEMICAL Co., LTD.), or Poem J-0081HV (manufactured by RIKEN VITAMIN CO., LTD.); an aliphatic phosphate ester ADEKA TOL NP-620, NP-650, NP-660, NP-675, NP-683, NP-686, ADEKA COL CS-141E, TS-230E, etc. (manufactured by ADEKA CORPORATION), SORGEN 30V, 40, TW-20, TW-80, NOIGEN CX-100, etc. (DKS Co. Ltd.); a fluorosurfactant, for example, BYK-340 (manufactured by BYK-Chemie), MEGAFACE (DIC Corporation), etc.; or a silicone (silicon) surfactant having a siloxane backbone, for example, BYK-313, 315N, 322, 326, 331, 347, or 348, BYK-UV 3500, 3510, 3530, or 3570 (all manufactured by BYK-Chemie), KF-6011, KF-6028, or KF-96L (all manufactured by Shin-Etsu Chemical Co., Ltd.). Among them, polyester-modified silicone or polyether-modified silicone are preferably used. Specific examples of an acetylene glycol surfactant include SURFYNOL (registered trademark) 82, 104, 465, 485, or TG (all manufactured by Air Products Inc.), OLFINE (registered trademark) STG or E1010 (all manufactured by Nissin Chemical Industry Co., Ltd.), etc. The surfactant is not limited to those described above and any anionic, cationic, ampholytic, or nonionic surfactant may be used. Furthermore, a plurality of, that is, two or more surfactants may also be used.

Among them, the surfactant preferably contains a surfactant having a siloxane backbone. An non-aqueous ink containing the surfactant having a siloxane backbone can produce a recorded matter with an improved leveling property or abrasion resistance.

The non-aqueous ink composition according to the present embodiment may contain a surfactant different from the surfactant having a siloxane backbone in addition to the surfactant having a siloxane backbone.

A content of the surfactant in the non-aqueous ink composition according to the present embodiment is not particularly limited, but a lower limit of the content of the surfactant is preferably in a range of 0.01% by mass or more, more preferably in a range of 0.05% by mass or more, and further preferably in a range of 0.1% by mass or more. A upper limit of the content of the surfactant is preferably in a range of 3.0% by mass or less, more preferably in a range of 1.0% by mass or less, and further preferably in a range of 0.8% by mass or less.

[Wax]

A wax may be added to the non-aqueous ink composition according to the present embodiment. This can give a slip property to a photoluminescent layer formed of the non-aqueous ink composition according to the present embodiment and thus improve abrasion resistance of the resulting printed matter.

As used herein, the wax is an organic matter or a silicone compound that is solid at room temperature or less but liquefied upon heating. Specific examples thereof include a low molecular weight polyolefin wax such as polyethylene, polypropylene, polybutene, a polyethylene mixed wax, a polypropylene wax, or a polypropylene mixed wax; silicone (silicon) having a softening point; a silicone (silicon)-acrylic wax; a fatty acid amide such as oleic amide, erucic amide, ricinoleic amide, or stearic amide; a vegetable wax such as an ester wax, a carnauba wax, a rice wax, a candelilla wax, a Japan wax, or a jojoba oil; an animal wax such as a bees wax, lanolin, or a spermaceti; a mineral wax such as a montan wax, ozokerite, ceresin, or Fischer-Tropsch wax; a petroleum wax such as a paraffin wax, a microcrystalline wax, petrolatum, or a paraffin mixed wax; or modified products thereof. These waxes are readily commercially available. For the non-aqueous ink composition according to the present embodiment, the wax may be used alone or two or more thereof may be used in combination.

The wax contained in the non-aqueous ink composition according to the present embodiment may be liquid at normal temperature. A melting point thereof is not particularly limited, but a lower limit of the melting point is preferably 20° C. or more, more preferably 25° C. or more, and further preferably 30° C. or more. The wax having a melting point of 20° C. or more can prevent the wax in the resulting printed matter from melting to make a surface of the printed matter be sticky. Thus, the printed matter can be prevented from adhering to another printed matter. An upper limit of the melting point is preferably 130° C. or less, more preferably 125° C. or less, and further preferably 120° C. or less. The wax having a melting point of 130° C. or less can prevent blushing of the resulting printed matter or can add a more suitable metallic luster to an object.

A lower limit of a content of the wax in the non-aqueous ink composition according to the present embodiment is not particularly limited, but is preferably 0.05% by mass or more, more preferably 0.07% by mass or more, and further preferably 0.1% by mass or more relative to a total amount of the non-aqueous ink composition. Such a content can more suitably give a slip property to a surface of an object and thus result in a printed matter with good abrasion resistance. An upper limit of the content of the wax is preferably 1.0% by mass or less, more preferably 0.8% by mass or less, and further preferably 0.5% by mass or less relative to a total amount of the non-aqueous ink composition. Such a content can add a more suitable metallic luster to the object.

[Other Components]

The non-aqueous ink composition according to the present embodiment may include, as an optional component, a known additive, for example, a light stabilizer such as an antioxidant or a UV absorber; an epoxidated compound, a polyvalent carboxylic acid, a surface regulating agent, a slipping agent, a leveling agent (e.g., an acrylic- or silicone-leveling agent), an anti-foaming agent, a pH adjusting agent, a bactericide, a preservative, a deodorant, a charge adjusting agent, a wetting agent; or a polymerizable compound. Specific examples of the antioxidant include a hindered phenol antioxidant, an amine antioxidant, a phosphorous antioxidant, a sulfur antioxidant, or a hydrazine antioxidant. Specifically, BHA (2,3-butyl-4-oxyanisol), BHT (2,6-di-t-butyl-p-cresol), etc. are exemplified. Furthermore, a benzophenone compound or a benzotriazole compound may be used as the UV absorber. Furthermore, specific examples of the epoxidated compound include epoxy glyceride, epoxy fatty acid monoester, or epoxy hexahydrophthalate. More specifically, ADK CIZER O-130P or ADK CIZER O-180A (manufactured by ADEKA CORPORATION) is exemplified. Specific examples of the polyvalent carboxylic acid include citric acid, maleic acid, etc.

The non-aqueous ink composition according to the present embodiment preferably contains as little water as possible. Specifically, a water content is preferably 5.0% by mass or less, more preferably 3.0% by mass or less, further preferably 1.0% by mass or less, and even further preferably 0.5% by mass or less relative to a total amount of the non-aqueous ink composition. This is because a brilliant pigment, especially a brilliant pigment containing a metal such as aluminum may be altered by water. Furthermore, a component in the ink composition may be altered by water to thereby change compatibility, potentially resulting in poor storage stability of the ink composition. The water content of 5.0% by mass or less can prevent deterioration of discharge stability to thereby further improve storage stability of the ink composition.

(Viscosity and Surface Tension of Non-Aqueous Ink Composition)

The non-aqueous ink composition according to the present embodiment preferably has a viscosity of 30 mPa·s or less, more preferably 20 mPa·s or less, and further preferably 15 mPa·s or less at 25° C. from the viewpoints of inkjet dischargeability and discharge stability. Furthermore, the non-aqueous ink composition according to the present embodiment preferably has a viscosity of 2.0 mPa·s or more, more preferably 3.0 mPa·s or more, and further preferably 3.5 mPa·s or more.

Furthermore, the non-aqueous ink composition according to the present embodiment preferably has a surface tension of 20 mN/m or more, more preferably 22 mN/m or more, and further preferably 24 mN/m or more at 25° C. from the viewpoints of inkjet dischargeability, discharge stability, and leveling property on a substrate. Furthermore, the non-aqueous ink composition according to the present embodiment preferably has a surface tension of 40 mN/m or less, more preferably 37 mN/m or less, and further preferably 35 mN/m or less.

(Method for Producing Non-Aqueous Ink Composition)

A method for producing the non-aqueous ink composition according to the present embodiment may be, for example, a method for producing a non-aqueous ink composition by mixing a brilliant pigment and an organic solvent.

For example, the non-aqueous ink composition according to the present embodiment may be prepared by a method in which an organic solvent, a brilliant pigment, and optionally a resin, a surfactant, etc. are added; a method in which a brilliant pigment and a dispersing agent are added to and dispersed in an organic solvent and then a resin, a surfactant, and optionally other components are added thereto; or a method in which a brilliant pigment, a resin, a surfactant, and optionally other components are added to an organic solvent and then the brilliant pigment is dispersed therein.

In this case, a metal-containing brilliant pigment having a particle size so that a value of (D90–D10)/D50 is 2 or less and the D90 is 5.0 μm or less is used. A method for obtaining a metal-containing brilliant pigment having a particle size satisfying such a relationship may be, for example, a method in which a particle size is adjusted by controlling a dispersion liquid that contains a metal-containing brilliant pigment to a predetermined output for a predetermined time; a method in which a metal-containing brilliant pigment having a particle size equal to or larger than a predetermined particle size is removed by filtering; or a combination thereof.

Next, a printed matter obtained from an ink composition of the present invention will be described.

<3. Printed Matter>

A printed matter obtained using the ink composition according to the above-described embodiment includes a substrate (recording medium) and the ink composition according to the above-described embodiment applied on a surface of the substrate (recording medium), and can add metallic luster to an object.

A metal-containing brilliant pigment included in the non-aqueous ink composition has a high inkjet discharge stability since the metal-containing brilliant pigment has a particle size controlled to fall within a predetermined range. Therefore, a printed matter with a desired metallic luster can be obtained.

Hereinafter, the printed matter will be described.

[Substrate (Recording Medium)]

A substrate (recording medium) that can be used in a recording method according to the present embodiment is not particularly limited and various substrates may be used including a non-absorbing substrate such as a resin substrate or a metal plate glass; an absorbing substrate such as paper or a fabric; or a substrate of which surface is coated such as a substrate including a receiving layer.

Examples of the non-absorbing substrate include a resin substrate such as a polyester resin, polypropylene synthetic paper, a vinyl chloride resin, a polyimide resin, an acrylic resin, PET, polycarbonate, PE, or PP; metal, metal foil-coated paper, glass, synthetic rubber, or naturel rubber.

Examples of the absorbing substrate include woody paper, wood containing paper, woodfree paper, synthetic paper, cotton, artificial fiber textile, silk, hemp, cloth, nonwoven fabric, or leather.

Examples of the substrate of which surface is coated include coated paper, art paper, cast-coated paper, lightweight coated paper, or ultra lightweight coat paper. Furthermore, various substrates with an ink absorbing layer may also be used.

[Primer]

A primer (primer agent) may be applied onto a substrate. The primer is applied onto a surface of a substrate (recording medium), and functions to improve fixability of a colored ink composition containing a color material (dye, pigment) or a photoluminescent ink composition containing a brilliant pigment or prevent bleeding to thereby improve image quality.

The primer may be an active energy ray curable ink composition, a solvent-based ink composition containing a solvent, or an water-based ink composition containing water. A primer agent may be, for example, the below-described colored ink composition which contains, as a main component, a resin component and a polymerizable compound and which contains no or a decreased amount of a color material so that a color is not visible. Furthermore, the primer agent may be, for example, a conventionally known primer agent.

A method for applying the primer onto a surface of a substrate (recording medium) may be any method, for example, spray coating; application using a towel, a sponge, a nonwoven fabric, a tissue, etc.; a dispenser, brushing, gravure printing, flexographic printing, silk-screen printing, inkjet, or thermal transfer.

[Colored Ink Composition]

When a photoluminescent ink composition is printed, a colored ink composition may be used in combination. The colored ink composition is an ink composition containing a color material (dye, pigment) to be used for a common ink composition different from the brilliant pigment. Furthermore, the colored ink composition may be printed before or after the photoluminescent ink composition is printed. The colored ink composition may be an active energy ray curable ink composition, a non-aqueous ink composition containing a color material but no water, or a water-based ink composition containing a color material and water. Furthermore, the colored ink composition may be a plurality of ink compositions (e.g., including two or more of a yellow ink, a magenta ink, a cyan ink, a black ink, a light magenta ink, a light cyan ink, a light black ink, a white ink, an orange ink, a green ink, a blue ink, a red ink, etc.) Note that, the colored ink composition may contain a resin.

Furthermore, a method for applying the colored ink composition is not particularly limited. Examples thereof include a spray method, a coater method, an inkjet method, a gravure method, a flexographic method, etc. Among them, the colored ink composition is preferably discharged (applied) by an inkjet method. The inkjet method can be used to easily discharge (apply) the colored ink composition onto a desired position or an entire surface on a substrate.

The color material contained in the colored ink composition is not particularly limited and may be a dye or a pigment, with a pigment ink composition being preferred due to its good water resistance or light resistance. The pigment that can be used for the colored ink composition is not particularly limited. Examples thereof include an organic pigment or an inorganic pigment to be used for a conventional ink composition. These may be used alone or two or more thereof may be used in combination. Specific examples of the organic pigment include an insoluble azo pigment, a soluble azo pigment, a dye derivative, a phthalocyanine organic pigment, a quinacridone organic pigment, a perylene organic pigment, a dioxazine organic pigment, a nickel azo pigment, an isoindolinone organic pigment, a pyranthron organic pigment, a thioindigo organic pigment, a condensed azo organic pigment, a benzimidazolone organic pigment, a quinophthalone organic pigment, an isoindoline organic pigment; or an organic solid solution pigment such as a quinacridone solid solution pigment or a perylene solid solution pigment. Examples of the inorganic pigment include titanium oxide, zinc oxide, etc. Examples of other pigments include carbon black, etc. The pigment that can be used for the ink composition may be a combination of a plurality of the organic pigments or the inorganic pigments or a combination of a pigment dispersion in which the pigment is dispersed in a water-soluble solvent using a pigment dispersing agent and a self-dispersing pigment.

[Overcoat Agent]

An overcoat agent may be applied on a surface of a printed matter. The overcoat agent is formed on a top surface (e.g., a surface of a colored ink composition) of a printed matter and functions to improve durability of a printed matter.

The overcoat agent may be an active energy ray curable ink composition, a non-aqueous ink composition containing no water, or a water-based ink composition containing water. The overcoat agent may be, for example, a colored ink composition which contains, as a main component, a resin component or a polymerizable compound and which contains no or a decreased amount of the above-described color material (dye, pigment) so that color is not visible. Use of an overcoat agent having the same composition as a colored ink composition or a photoluminescent ink composition can improve adhesion to the colored ink composition or the photoluminescent ink composition. Furthermore, the overcoat agent may be, for example, a conventionally known overcoat agent.

A method for applying the overcoat agent onto a surface of a printed matter may be any method, for example, spray coating; application using a towel, a sponge, a nonwoven fabric, a tissue, etc.; a dispenser, brushing, gravure printing, flexographic printing, silk-screen printing, inkjet, or thermal transfer.

<4. Recording Method>

A method for recording on a surface of a substrate (recording medium) using the non-aqueous ink composition (photoluminescent ink composition) according to the above-described embodiment is a method in which a non-aqueous ink composition (photoluminescent ink composition) is discharged by an inkjet method. Discharge of the ink composition by an inkjet method enables small-lot production of a printed matter.

An inkjet recording device may be any of inkjet recording devices in a piezoelectric mode, a thermal mode, or an electrostatic mode. A piezoelectric mode is preferred from the viewpoints of versatility and high definition.

The inkjet recording device may include a drying mechanism such as a heater or a fan for drying the non-aqueous ink composition (photoluminescent ink composition) discharged by an inkjet method.

A metal-containing brilliant pigment included in the non-aqueous ink composition (photoluminescent ink composition) has a high inkjet discharge stability since the metal-containing brilliant pigment has a particle size controlled to fall within a predetermined range. Therefore, a printed matter with a desired metallic luster can be obtained by a recording method using the ink composition.

<5. Method for Producing Printed Matter>

A recording method in which the non-aqueous ink composition (brilliant ink composition) according to the above-described embodiment is discharged on a surface of a substrate may also be defined as a method for producing a printed matter.

A method for producing a printed matter using the non-aqueous ink composition (photoluminescent ink composition) can produce a printed matter with desired metallic luster.

Examples

Hereinafter, the present invention will be described in more detail with reference to Examples, but the present invention is not limited thereto in any way.

1. Production of Resin (Acrylic Resin)

A mixture of 150 g of methyl methacrylate, 50 g of butyl methacrylate, and 3.6 g of t-butylperoxy-2-ethylhexanoate (polymerization initiator) was added dropwise to 300 g of diethylene glycol diethyl ether kept at 100° C. for 1.5 hours. After the completion of the addition, the resultant was reacted at 100° C. for 2 hours and then cooled to thereby obtain a colorless and transparent methyl methacrylate polymer solution. Thereafter, a solvent was thoroughly distilled off from the polymer solution to thereby obtain a methyl methacrylate polymer (acrylic resin having a weight average molecular weight of 30,000) (designated as "Resin 2" in Table 2 below).

2. Production of Brilliant Pigment

A resin layer coating liquid composed of 3.0% by mass of cellulose acetate butylate (butylation rate: 35 to 39%, manufactured by KANTO CHEMICAL CO., INC.) and 97% by mass of isopropanol was evenly applied onto a PET film having a thickness of 100 μm using a bar coating method and dried at 60° C. for 10 min to thereby form a resin layer thin film on the PET film. Then, a metal-containing thin film (aluminum) having a predetermined average film thickness (10 to 70 nm) was formed on the above-described resin layer using a vacuum deposition device (VE-1010 vacuum deposition device, manufactured by Vacuum device company).

Then, the thus-formed laminate was released, pulverized, and dispersed simultaneously in diethylene glycol diethyl ether using a VS-150 ultrasonic dispersion device (manufactured by AS ONE Corporation) to thereby obtain a brilliant pigment dispersion liquid.

The resulting brilliant pigment dispersion liquid was filtered through a SUS mesh filter to remove coarse particles. Then, the resulting filtrate was poured into a round bottom flask and diethylene glycol diethyl ether was distilled off using a rotary evaporator. Thus, the brilliant pigment dispersion liquid was concentrated and then a concentration of the brilliant pigment dispersion liquid was adjusted to thereby prepare brilliant pigment dispersion liquids containing brilliant pigments A to 0. The brilliant pigment was adjusted for particle size by varying ultrasonic intensity, treatment time, and opening of the filter. A volume-based cumulative 10% particle size (D10), a volume-based cumulative 50% particle size (D50), a volume-based cumulative 90% particle size (D90), a value of (D90–D10)/D50, and a film thickness of each of the brilliant pigments A to 0 are presented in Table 1. Note that, the particle size was measured using a laser diffraction particle size analyzer "SALD 7500nano" manufactured by SHIMADZU CORPORATION.

TABLE 1

| | Pig-ment A | Pig-ment B | Pig-ment C | Pig-ment D | Pig-ment E | Pig-ment F | Pig-ment G | Pig-ment H | Pig-ment I | Pig-ment J | Pig-ment K | Pig-ment L | Pig-ment M | Pig-ment N | Pig-ment O |
|---|---|---|---|---|---|---|---|---|---|---|---|---|---|---|---|
| D10 (μm) | 0.88 | 0.42 | 0.79 | 1.25 | 2.10 | 0.55 | 1.20 | 1.66 | 0.28 | 0.52 | 0.58 | 1.88 | 2.02 | 2.11 | 0.50 |
| D50 (μm) | 1.12 | 0.86 | 1.40 | 1.80 | 2.55 | 2.10 | 3.23 | 2.82 | 0.44 | 1.04 | 1.01 | 3.15 | 3.30 | 3.42 | 2.46 |
| D90 (μm) | 1.96 | 1.37 | 2.33 | 2.28 | 3.02 | 4.46 | 4.95 | 4.88 | 1.16 | 2.16 | 6.50 | 5.86 | 6.24 | 11.00 | 7.10 |
| (D90 – D10)/D50 | 0.96 | 1.10 | 1.10 | 0.57 | 0.36 | 1.86 | 1.16 | 1.14 | 2.00 | 1.58 | 5.86 | 1.26 | 1.28 | 2.60 | 2.68 |
| Film thickness (nm) | 20 | 20 | 10 | 70 | 50 | 25 | 15 | 70 | 30 | 70 | 20 | 70 | 50 | 50 | 20 |

3. Production of Ink Composition

The above-described "brilliant pigment dispersion liquid" was used to produce an ink composition. Specifically, the above-described brilliant pigment dispersion liquid, various organic solvents, a resin (acrylic resin), and a surfactant were used in proportions described in Table below to thereby prepare ink compositions of Examples and Comparative Examples. The unit is in % by mass.

TABLE 2

| | | | Ex-ample 1 | Ex-ample 2 | Ex-ample 3 | Ex-ample 4 | Ex-ample 5 | Ex-ample 6 | Ex-ample 7 | Ex-ample 8 | Ex-ample 9 | Ex-ample 10 |
|---|---|---|---|---|---|---|---|---|---|---|---|---|
| Ink composition | brilliant pigment | Pigment type | Pigment A | Pigment A | Pigment B | Pigment B | Pigment C | Pigment D | Pigment E | Pigment F | Pigment G | Pigment H |
| | | Content | 2.0 | 2.0 | 2.0 | 2.0 | 3.0 | 1.0 | 1.5 | 1.5 | 1.5 | 1.5 |
| | Organic sovent | DEGMEE | 67.3 | | | 57.3 | | 30.0 | | 38.3 | | |
| | | DEGDEE | | 67.3 | 49.3 | | 50.0 | 30.0 | 67.8 | | 38.3 | 38.3 |
| | | DEGBEAC | | | 18.0 | | | | | 30.0 | | |
| | | TEGBE | 15.0 | | | 20.0 | | | | | | |
| | | DPGME | | 15.0 | | | | 20.0 | 15.0 | | 30.0 | 30.0 |
| | | GBL | 15.0 | | | | | 18.3 | 15.0 | | 30.0 | |
| | | PC | | 15.0 | | | | | | 30.0 | | |
| | | DEP | | | 30.0 | | | | | | | |
| | | DEF | | | | 20.0 | 46.3 | | | | | 30.0 |
| | Resin | Resin 1 | 0.5 | 0.5 | | | 0.5 | 0.5 | 0.5 | | | |
| | | Resin 2 | | | 0.5 | 0.5 | | | | | | |
| | Surfactant | Surfactant 1 | 0.2 | 0.2 | | | | 0.2 | 0.2 | 0.2 | | |
| | | Surfactant 2 | | | 0.2 | 0.2 | 0.2 | | | | 0.2 | 0.2 |
| | | Total | 100.0 | 100.0 | 100.0 | 100.0 | 100.0 | 100.0 | 100.0 | 100.0 | 100.0 | 100.0 |
| Evaluation | Passability | | A | A | A | A | A | A | A | A | B | A |
| | Dischargeability | | A | A | A | A | A | A | A | B | B | B |
| | Luster | | A | A | A | A | A | A | A | A | A | A |

TABLE 2-continued

| | | | Example 11 | Example 12 | Comparative Example 1 | Comparative Example 2 | Comparative Example 3 | Comparative Example 4 | Comparative Example 5 |
|---|---|---|---|---|---|---|---|---|---|
| Ink composition | brilliant pigment | Pigment type | Pigment I | Pigment J | Pigment K | Pigment L | Pigment M | Pigment N | Pigment O |
| | | Content | 3.0 | 2.0 | 1.0 | 1.0 | 1.5 | 2.0 | 2.0 |
| | Organic sovent | DEGMEE | | | 30.0 | 30.0 | | | |
| | | DEGDEE | 71.3 | 72.3 | 30.0 | 30.0 | 67.8 | 67.3 | 72.3 |
| | | DEGBEAC | | 5.0 | | | | | 5.0 |
| | | TEGBE | 5.0 | | | | | | |
| | | DPGME | | | 20.0 | 20.0 | 15.0 | 15.0 | |
| | | GBL | | | 18.3 | 18.3 | 15.0 | | |
| | | PC | | | | | | 15.0 | |
| | | DEP | | | | | | | |
| | | DEF | 20.0 | 20.0 | | | | | 20.0 |
| | Resin | Resin 1 | 0.5 | 0.5 | 0.5 | 0.5 | 0.5 | 0.5 | 0.5 |
| | | Resin 2 | | | | | | | |
| | Surfactant | Surfactant 1 | 0.2 | 0.2 | 0.2 | 0.2 | 0.2 | 0.2 | 0.2 |
| | | Surfactant 2 | | | | | | | |
| | | Total | 100.0 | 100.0 | 100.0 | 100.0 | 100.0 | 100.0 | 100.0 |
| Evaluation | | Passability | A | A | C | B | C | C | C |
| | | Dischargeability | A | B | C | C | C | C | C |
| | | Luster | B | A | B | B | B | C | C |

In Table, "DEGMEE" denotes diethylene glycol methyl ethyl ether.

In Table, "DEGDEE" denotes diethylene glycol diethyl ether.

In Table, "DEGBEAC" denotes diethylene glycol butyl ether acetate.

In Table, "TEGBE" denotes triethylene glycol monobutyl ether.

In Table, "DPGME" denotes dipropylene glycol monomethyl ether.

In Table, "GBL" denotes γ-butyrolactone.

In Table, "PC" denotes propylene carbonate.

In Table, "DEP" denotes N,N-diethylpropionamide.

In Table, "DEF" denotes N,N-diethylformamide.

In Table, "Resin 1" denotes CAB551-0.01 (cellulose resin).

In Table, "Surfactant 1" denotes BYK-3500 (silicone surface regulating agent).

In Table, "Surfactant 2" denotes KF-96L-2cs (silicone surface regulating agent).

4. Evaluation

Evaluation of Luster

Printed matters produced using the non-aqueous ink compositions of Examples and Comparative Examples were evaluated for luster. Specifically, each of the non-aqueous ink compositions of Examples and Comparative Examples was discharged on a surface of a vinyl chloride film using an inkjet recording device "Material printer DMP-2850" manufactured by FUJIFILM Corporation and then dried by heating to 60° C. to thereby produce a printed matter. The resulting printed matter was evaluated for luster (in Table, designated as "Luster") according to the below-described evaluation criteria by irradiating a photoluminescent layer with incidence light at an incidence angle of 45° from a printed surface and measuring an L* value in an L*a*b* colorimetric system at a measurement angle that is an angle shifted by 150 in a normal direction from a reflection angle of the incidence angle as shown in FIG. 1 using a multiangle color measuring system CM-M6 manufactured by KONICA MINOLTA, INC. Evaluation criteria A: The L* value was 130 or more.

B: The L* value was 110 or more and less than 130.

C: The L* value was less than 110.

A and B are practically usable.

Filter Passability Test

The ink compositions of Examples and Comparative Examples were evaluated for a filter passability. Specifically, each of the ink compositions of Examples and Comparative Examples was passed through a stainless steel 2000 mesh filter having a diameter of 25 mm and an amount of the ink composition passed through the filter was measured and evaluated. Evaluation criteria A: Twenty milliliters or more of the ink composition passed through the filter.

B: Five milliliters or more and less than 20 mL of the ink composition passed through the filter.

C: Less than 5 mL of the ink composition passed through the filter.

A and B are usable.

Inkjet Dischargeability Test

Each of the ink compositions of Examples and Comparative Examples was evaluated for inkjet dischargeability using a liquid droplet observation device JetXpert manufactured by imageXpert LLC. Specifically, each of the ink compositions of Examples and Comparative Examples was discharged from an inkjet head for 10 min and evaluated for non-discharge, misalignment, or scattering. Evaluation criteria A: A discharge failure rate was less than 3%.

B: A discharge failure rate was 3% or more and less than 10%.

C: A discharge failure rate was 10% or more.

A and B are usable.

Table 2 demonstrates that the ink composition containing the metal-containing brilliant pigment that is controlled so as to have a value of (D90–D10)/D50 of 2 or less and the D90 of 5.0 μm or less has an inkjet discharge stability and can produce good luster.

The invention claimed is:

1. A non-aqueous ink composition to be discharged by an inkjet method, the composition comprising:

an organic solvent; and a brilliant pigment, the brilliant pigment comprising a metal-containing brilliant pigment, the metal-containing brilliant pigment having a volume-based cumulative 10% particle size D10 measured in μm, a volume-based cumulative 50% particle size D50 measured in μm, and a volume-based cumulative 90% particle size D90 measured in μm satisfying a relationship of Expression (1) below:

$$(D90 - D10)/D50 \le 1.6 \qquad (1)$$

and the metal-containing brilliant pigment having the D90 of 5.0 μm or less, and the D50 is in a range of 0.86 μm or more and 3.0 μm or less.

2. The non-aqueous ink composition according to claim 1, having the D90 in a range of 1.0 μm or more and 4.5 μm or less.

3. The non-aqueous ink composition according to claim 1, wherein the brilliant pigment is comprised in a range of 0.3% by mass or more and 5.0% by mass or less relative to a total amount of the ink composition.

4. A printed matter, comprising:

a substrate; and the non-aqueous ink composition according to claim 1 applied on a surface of the substrate.

5. A recording method comprising discharging a non-aqueous ink composition by an inkjet method, the non-aqueous ink composition comprising an organic solvent and a brilliant pigment, the brilliant pigment comprising a metal-containing brilliant pigment, the metal-containing brilliant pigment having a volume-based cumulative 10% particle size D10 measured in μm, a volume-based cumulative 50% particle size D50 measured in μm, and a volume-based cumulative 90% particle size D90 measured in um satisfying a relationship of Expression (1) below:

$$(D90 - D10)/D50 \le 1.6 \qquad (1)$$

and the metal-containing brilliant pigment having the D90 of 5.0 μm or less, and the D50 is in a range of 0.86 μm or more and 3.0 μm or less.

6. A method for producing a printed matter, the method comprising discharging a non-aqueous ink composition by an inkjet method, the non-aqueous ink composition comprising an organic solvent and a brilliant pigment, the brilliant pigment comprising a metal-containing brilliant pigment, the metal-containing brilliant pigment having a volume-based cumulative 10% particle size D10 measured in μm, a volume-based cumulative 50% particle size D50 measured in μm, and a volume-based cumulative 90% particle size D90 measured in μm satisfying a relationship of Expression (1) below:

$$(D90 - D10)/D50 \le 1.6 \qquad (1)$$

and the metal-containing brilliant pigment having the D90 of 5.0 μm or less, and the D50 is in a range of 0.86 μm or more and 3.0 μm or less.

7. The non-aqueous ink composition according to claim 2, wherein the brilliant pigment is comprised in a range of 0.3% by mass or more and 5.0% by mass or less relative to a total amount of the ink composition.

8. A printed matter, comprising:

a substrate; and the non-aqueous ink composition according to claim 2 applied on a surface of the substrate.

9. A printed matter, comprising:

a substrate; and the non-aqueous ink composition according to claim 3 applied on a surface of the substrate.

* * * * *